(12) United States Patent
Spahn

(10) Patent No.: US 9,599,730 B2
(45) Date of Patent: Mar. 21, 2017

(54) COUNTING DIGITAL X-RAY DETECTOR AND METHOD FOR RECORDING AN X-RAY IMAGE

(71) Applicant: Martin Spahn, Erlangen (DE)

(72) Inventor: Martin Spahn, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 193 days.

(21) Appl. No.: 14/138,041

(22) Filed: Dec. 21, 2013

(65) Prior Publication Data

US 2014/0175299 A1    Jun. 26, 2014

(30) Foreign Application Priority Data

Dec. 21, 2012    (DE) .................. 10 2012 224 209

(51) Int. Cl.
*G01T 1/24*    (2006.01)
*G01T 1/29*    (2006.01)

(52) U.S. Cl.
CPC ............ *G01T 1/247* (2013.01); *G01T 1/2928* (2013.01)

(58) Field of Classification Search
CPC .......... G01T 1/17; G01T 1/2928; G01T 1/247
USPC ........................................ 250/394
See application file for complete search history.

(56) References Cited

U.S. PATENT DOCUMENTS

2006/0086913 A1   4/2006  Spahn
2007/0114424 A1   5/2007  Danielsson et al.

FOREIGN PATENT DOCUMENTS

DE    10 2004 048 962 A1    4/2006
DE    10 2011 077 397        12/2012
DE    102011077397        * 12/2012  ........... A61B 6/0407

OTHER PUBLICATIONS

German Office Action dated Sep. 27, 2013 for corresponding German Patent Application No. DE 10 2012 224 209.0 with English translation.
M. Spahn, "Flat detectors and their clinical applications," Eur Radiol, vol. 15, pp. 1934-1947, 2005.
Sonnabend K. et al: "The Darmstadt High-Intensity Photon Setup (DHIPS) at the S-DALINAC", In: Nuclear Instruments and Methods in Physics Research A; www.elsevier.com/locate/nima; pp. 6-12; 2011.

* cited by examiner

*Primary Examiner* — David Porta
*Assistant Examiner* — Gisselle Gutierrez
(74) *Attorney, Agent, or Firm* — Lempia Summerfield Katz LLC

(57) ABSTRACT

A counting digital x-ray detector for recording x-ray images of an object irradiated by x-ray radiation includes a direct x-ray converter for converting x-ray radiation into an electric signal and a matrix with a plurality of counting pixel elements. At least one part of the counting pixel elements has a signal input and two circuits for converting the signal into a count signal. A first circuit of the two circuits is configured to convert the signal entering the respective pixel element directly into a count signal and to count the count signal. A second circuit of the two circuits is configured to convert the signal entering directly into the respective pixel element together with coincident occurring signals of at least one neighboring pixel element into a count signal and to count the count signal. The first circuit and/or the second circuit are able to be activated individually and both together.

20 Claims, 12 Drawing Sheets

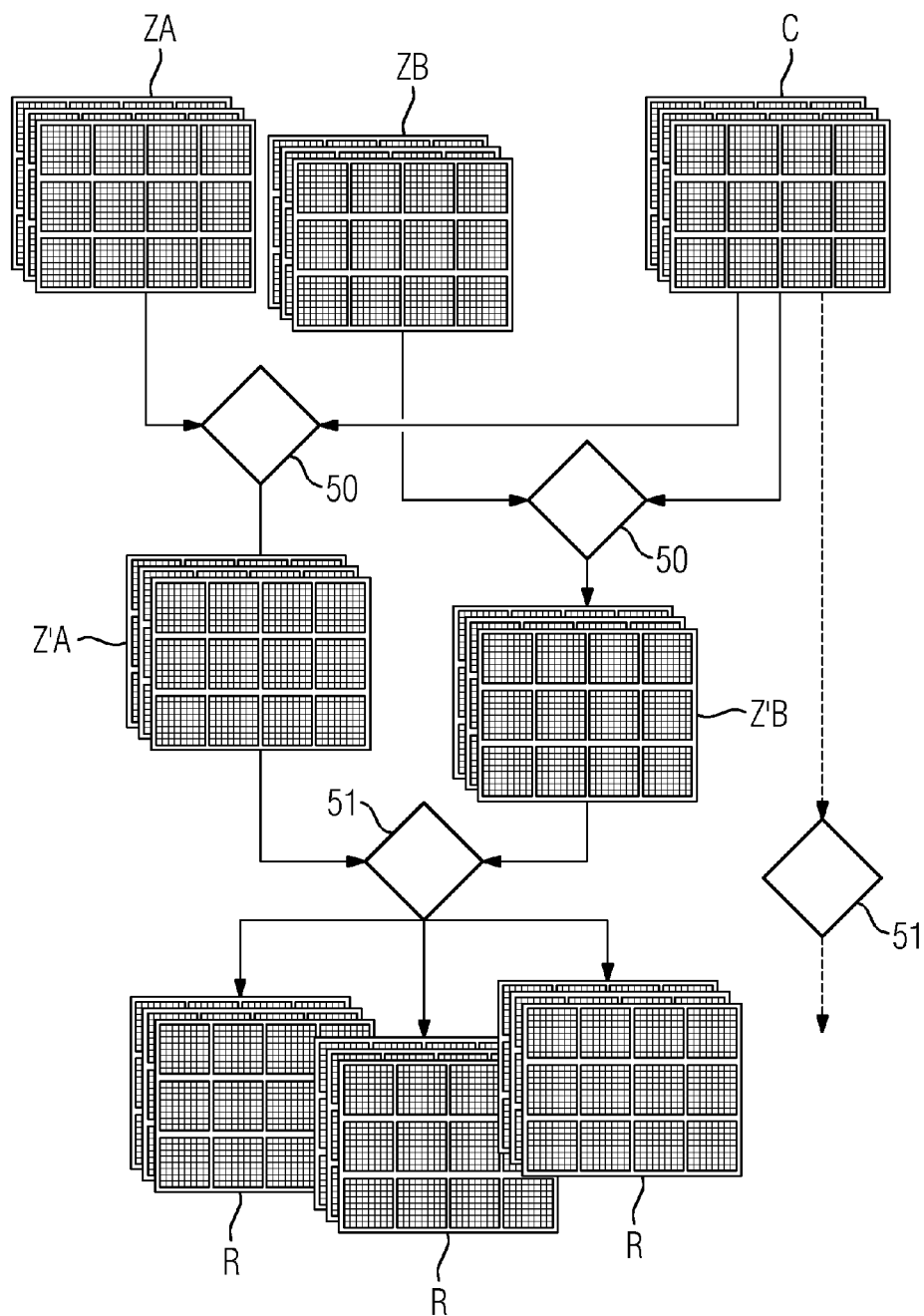

COUNTING DIGITAL X-RAY DETECTOR AND METHOD FOR RECORDING AN X-RAY IMAGE

This application claims the benefit of DE 10 2012 224 209.0, filed on Dec. 21, 2012, which is hereby incorporated by reference in its entirety.

BACKGROUND

The present embodiments relate to a counting digital x-ray detector and to a method for recording x-ray images.

X-ray systems are used for imaging for diagnostic examination and for interventional procedures in cardiology, radiology and surgery, for example. X-ray systems 16, as shown in FIG. 1, have an x-ray tube 18 and an x-ray detector 17, disposed together on a C-arm 19, for example, a high-voltage generator for generation of the tube voltage, an imaging system 21 (e.g., inclusive of at least one monitor 22), a system control unit 20, and a patient table 23. Systems with two planes (e.g., two C-arms) are also used in interventional radiology. Flat-panel x-ray detectors may be used as x-ray detectors in many areas of medical x-ray diagnostics and intervention (e.g., in radiography, interventional radiology, cardio angiography, but also in therapy for imaging within the context of checking and radiation therapy planning or mammography).

Current flat-panel detectors may be integrating detectors and are based primarily on scintillators, the light of which is converted in matrices of photodiodes into electrical charge. These may be be read out row-by-row via active control elements. FIG. 2 shows the basic structure of an indirect converting flat-panel x-ray detector currently used, having a scintillator 10, an active read-out matrix 11 made of amorphous silicon with a plurality of pixel elements 12 (e.g., with photodiode 13 and switching element 14) and activation and read-out electronics 15 (see, e.g., M. Spahn, "Flat detectors and their clinical applications," Eur Radiol, (2005), 15: 1934-1947). Depending on the beam quality, the quanta efficiency for a scintillator made of CsJ with a layer thickness of, for example, 600 µm, depending on beam quality, lies between around 50% and 80% (see, e.g., M. Spahn, "Flat detectors and their clinical applications," Eur Radiol (2005), 15: 1934-1947). The local-frequency-dependent detective quantum efficiency DQE(f) is delimited upwards by this and for typical pixel sizes of, for example, 150 µm to 200 µm and, for the local frequencies of 1 to 2 lp/mm of interest for the application, lies well below this figure. To make new applications (e.g., dual-energy, material-separation) possible, but also to increase the quanta efficiency further, the potential of counting detectors or energy-discriminating counting detectors mainly based on direct-converting materials (e.g., CdTe or CdZTe=CZT) and contacted application specific integrated circuits (ASICs) (e.g., implemented in CMOS technology) is increasingly being investigated.

A possible layout of such counting detectors is presented in FIG. 3. X-radiation is converted in direct converter 24 (e.g., CdTe or CZT), and the charge carrier pairs generated are separated via an electrical field that is created by a common top electrode 26 and a pixel electrode 25. The charge creates a charging pulse in one of the pixel electrodes 26 configured in a pixel shape of the ASIC 27, the height of which corresponds to the energy of the x-ray quantum and which, if lying above a defined threshold value, is registered as a count event. The threshold value serves to distinguish between an actual event and electronic noise or also to suppress k fluorescence photons, for example, in order to avoid multiple counting. The ASIC 27, a corresponding section of the direct converter 24 and a coupling between direct converter 24 and ASIC 27 (e.g., connected to each other by bump bonds 36 in direct-converting detectors) each form the detector module 35 with a plurality of pixel elements 12. The ASIC 27 is disposed on a substrate 37 and is connected to peripheral electronics 38. A detector module may also have one or more ASICs and one or more part sections of a direct converter, selected as required.

FIG. 4 shows the general schematic of a counting pixel element 12. The electrical charge is collected at a pixel electrode 28 via the electrical field applied and amplified with the aid of a charge amplifier 29 and a feedback capacitor 40. In addition, the pulse shape may be adapted in a shaper (e.g., filter) at the output (not shown). An event is then counted by a digital memory unit (counter) 33 being incremented by one if the output signal lies above a threshold value that may be set. This is set via a discriminator 31. The threshold value may also be specified as a fixed analog value, but is generally applied via a digital-to-analog converter DAC 32, for example, and is thus able to be set variably in a certain range. The threshold value may either be set for each pixel locally (e.g., by the discriminator 31 and the DAC 32, as shown) or is also able to be set globally in the x-ray detector for all pixel elements. Subsequently, there may be a read out via an activation and read-out unit 38. FIG. 6 shows a corresponding schematic for an overall array of counting pixel elements 12 (e.g., 100×100 pixel elements each of 180 µm). In this example, the array would have a size of 1.8×1.8 cm². For large-surface detectors (e.g., 20×30 cm²), a number of detector modules 35 are combined (e.g., 11×17 would roughly produce this surface) and connected via the common peripheral electronics. Through silicon via (TSV) technology is used, for example, for the connection between ASIC and peripheral electronics in order to provide a four-sided arrangement of the modules as close to one another as possible.

In the case of counting and energy-discriminating x-ray detectors, two, three or more threshold values are introduced, and the level of the charge pulse, corresponding to the predefined threshold values (e.g., discriminator threshold values) is classified into one or more of the digital memory units (e.g., counters). The x-ray quanta counted in a particular energy range may be obtained by forming the difference of the counter contents of two corresponding counters. The discriminators are able to be set, for example, with the aid of digital-to-analog converters (DACs) for the detector module as a whole or for pixels within given limits or ranges. The counter contents of the pixel elements are read out module-by-module via a corresponding read-out unit. The read-out process uses a certain time during which further counting may not be performed without errors.

For x-ray quantum energies above the k edge of the respective detector material used (e.g., 27 keV for Cd, 32 keV for Te), k fluorescence dominates in the photo effect. As well as the photoelectron, a k fluorescence photon 42 may be re-emitted during the absorption of an x-ray quantum 41 that has somewhat less than the energy of the k edge (e.g., difference of the binding energies of the k shell and the shell from which the promoted electron originates), shown in FIG. 5. On account of the non-negligible average free wavelength of the k fluorescence photon 42 (e.g., approximately 120 µm for Cd and 66 µm for Te), three cases may now occur: (i) reabsorbed into the same pixel element as the primary photon; (ii) reabsorbed into a neighboring pixel element; or (iii) leaves the detector material completely.

The case of re-absorption into a neighboring pixel element (e.g., more likely for the x-ray energies typical in medical imaging than the case of not being absorbed in the detector material at all) now results in two count events occurring and the energy of the primary quantum being distributed over both pixel elements. Thus, both the counting rate and also the energies detected in each case are incorrect. The smaller the layout of the pixel elements, the more likely this case is to occur. For pixel sizes as are currently used in angiography, this is already a significant problem.

Other effects such as what is known as charge sharing (e.g., the distribution of the charge cloud that is generated at the edge of a pixel element) on this and at least one further neighboring pixel element may lead to similar effects such as k escape (e.g., k-fluorescence); depending on threshold value settings, pixel size, high voltage or field distribution in the detector material, absorption location, to multiple counting and a division of the energy between two or more pixel elements.

For counting and energy resolving x-ray detectors, it is important for the correct number of an x-ray quanta and the correct energy to be registered. To bring this about, there is the approach of resolving this problem by checking the coincidence (e.g., the essentially simultaneous occurrence) of two events in neighboring pixel elements. If two or more events thus essentially occur simultaneously in neighboring pixel elements, it may be assumed that the same event is involved. The probability of true coincidence (i.e., the same event) or false coincidence (i.e., the random simultaneous arrival of two primary quanta in neighboring pixel elements) being involved is dependent on a number of factors including x-ray flux, a temporal pulse width of the charge pulse or the size of the pixel elements. The greater the x-ray flux, the greater the probability of different events occurring in neighboring pixel elements (e.g., false coincidences).

In order to resolve the problem described above, next neighbor coincidence circuits may be used. In such cases, a check is made as to whether, starting from a pixel element, the direct neighboring pixel elements have likewise detected a count event above a given threshold (e.g., discriminator threshold). If this is the case, the events are only counted once, and the other signals are discarded. If the detector design is additionally energy-discriminating, then the total signal from the central and neighboring pixel elements is additionally combined, and this is sorted into the corresponding pixel element (e.g., the element with the highest signal) or into the counter or counters of the corresponding pixel element of which the threshold values are below the combined signal. Thus, for example, the pixel design has four counters with threshold values that correspond to energies of 25 keV, 45 keV, 65 keV and 85 keV. If the signal detected and combined according to coincidence is, for example, 50 keV, the signal will be classified (counted) into the counters with the threshold values at 25 keV and 45 keV. In general, the signal combination will be performed in the analog range in order to reconstruct the energy in the best possible manner. A digital coincidence circuit may however also be provided. Since a counter event always arises above the defined threshold values, energy intervals are generated by differentiation (e.g., in the above example, the energy interval from 45 to 65 keV by subtraction of the count events in the counter with threshold value 65 keV and that with the threshold value 45 keV). What has been described above is applicable for simple discriminators that only define one lower threshold value as a threshold. In principle, window discriminators that have both a lower and also an upper threshold value are also able to be used. Differentiation, as described above, is not then necessary.

Known coincidence circuits are shown in FIGS. 7 and 8, where circuit technology details are not shown. FIG. 7 shows a coincidence circuit in which the analog signals of the central pixel element 12.1 and the analog coincidence signals 45 of all direct neighboring pixel elements 12.2 are summed as analog values by a summation unit 44 and are then discriminated. If the sum signal lies above the discriminator threshold value 32 of the discriminator 31, then an event is counted. At the same time (not shown by the circuit diagram), no events are counted in the neighboring pixel elements 12.2. The figure also does not show that a number of discriminators with different threshold values and a number of counters may be present to discriminate different energies and count corresponding events. In addition, an additional discriminator that is to be exceeded to supply the analog signal to a summation may also be present in each pixel element. FIG. 8 shows a variant in which the coincidence circuit is realized as a digital circuit.

Suitable direct converters, which make high signals and count rates possible, such as, for example, CdTe or CZT may only be manufactured with known methods in small surfaces (e.g., of 2×2 cm$^2$ or 3×3 cm$^2$). ASICs with a complex pixel structure, as is needed for counting detectors, are currently only able to be manufactured with viable yields in small surfaces (e.g., similar dimensions as the detector material such as 2×2 cm$^2$ or 3×3 cm$^2$, possibly up to 2×8 cm$^2$ or 3×6 cm$^2$, so that in these examples four 2×2 cm$^2$ or two 3×3 cm$^2$ direct converter semiconductor pieces may be accommodated on the corresponding ASICs). Such detector modules are small compared to the overall size of an x-ray detector needed for applications in angiography, for example (e.g., 20×20 cm$^2$ or 30×40 cm$^2$).

The relatively small module surfaces provide that there are many pixel elements that occur at the edge or at a corner of the detector module. Their behavior differs from the behavior of pixel elements lying in the center, for example, because of the following effects: (i) k-fluorescence photons have a higher probability with edge pixels of escaping from the detector material than pixels lying in the center; (ii) the active surface of edge and corner pixel elements is frequently smaller than that of central pixel elements (e.g., on account of a guard ring at the edge of the detector material or in order to arrange the detector modules next to one another without loss of one or more pixel element rows or columns; and (iii) the field distribution at edge or corner pixel and thus possibly the charge collection efficiency may differ from the central pixel elements. Because of this and further effects, the response behavior of edge or corner pixel elements may differ from the response behavior of central pixel elements. In FIGS. 9 to 11, simplified pixel elements 12 with a coincidence circuit with a summation unit 44 are shown having different numbers of neighboring pixel elements. The rest of the circuit elements have been omitted for the sake of simplicity. The pixel element of FIG. 9 has eight neighboring pixel elements, which have been included in the coincidence circuit, the pixel element of FIG. 10 has five neighboring pixel elements, and the pixel element of FIG. 11 has three neighboring pixel elements.

Known coincidence circuits (e.g., next-neighbor coincidence) have at least two types of problems in conjunction with counting, direct-converting detector modules. At high counting rates, it is no longer possible to discriminate between true and false coincidences. Also, for pixel elements at the edges of the detector modules, connection to the pixel elements at the edges of the neighboring detector module is not able to be realized in practice, so that next-neighbor information is only partly available.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a counting digital x-ray detector that provides high-quality x-ray imaging and avoids the problems discussed above is provided.

One embodiment of a counting digital x-ray detector for recording x-ray images of an object irradiated by x-ray radiation has an x-ray converter (e.g., direct converter material) for converting x-ray radiation into an electrical signal and a matrix with a plurality of counting pixel elements. At least a part of the counting pixel elements each have a signal input and two circuits for converting the signal into a count signal. A first circuit of the two circuits is configured for converting the signal generated directly in the respective pixel element individually into a count signal and counting the signal, and a second circuit of the two circuits is configured for converting the signal generated directly in the respective pixel element together with coincidently occurring signals of at least one neighboring pixel element into a count signal and counting the signal. The first circuit and/or the second circuit are able to be activated individually and both together. During counting by the first circuit, an x-ray image, to which only the x-ray quanta that have arrived directly on the pixel element or the area of the x-ray converter to which the pixel element is assigned contribute, may be generated. For counting by the second circuit, which is configured as a coincidence circuit, an x-ray image, in which x-ray quanta arriving coinciding on neighboring pixel elements that compensates for interference effects such as k-fluorescence are also included, may be created.

The option of choosing between the first circuit and the second circuit, where the second circuit is configured as a coincidence circuit in the cases in which a counting by a coincidence circuit positively influences the image quality, enables this circuit to be activated. In other cases in which this circuit has a negative influence, the option of choosing between the first circuit and the second circuit enables this to be avoided. In addition, there is the option of activating both circuits simultaneously, creating two x-ray images and using the respective higher-quality image in each case or carrying out a correction of one of the two images by the other in each case. In this way, one embodiment of an x-ray detector makes high flexibility in the way in which the x-ray detector counts signals possible and may provide a greatly improved quality of x-ray imaging.

For equally high x-ray image quality, each of the counting pixel elements of the x-ray detector advantageously has a first circuit and a second circuit, respectively. A method for recording an x-ray image of an object with a counting digital x-ray detector of one or more of the present embodiments is provided. The x-ray detector is assigned to an x-ray system with an x-ray source for emitting x-ray radiation. The method includes determining or interrogating at least one parameter of the x-ray system, of the x-ray detector or of the respective pixel element. The method also includes activating, individually for each pixel element with two circuits, one of the two circuits individually or both circuits simultaneously depending on the parameter or the parameters. The method includes pixel-by-pixel converting of the x-ray radiation passing through the object and striking the x-ray detector into electrical signals in the pixel elements, and converting of the electrical signals into count signals by the respective activated circuit or circuits of the pixel elements and storage of the count signals. The method also includes reading out of the count signals and creation of one or more image datasets representing the object.

In one or more embodiments of the method, depending on one or more parameters of the x-ray system to which the x-ray detector is assigned and/or with which the x-ray detector is mechanically connected, for each pixel element, the most favorable variant for the image quality (e.g., first circuit or second circuit or both circuits) is activated, so that the best possible image quality may be obtained. The parameter or the parameters may be interrogated from a memory or a system controller of the x-ray system, for example, but may also be determined directly or measured.

In accordance with an embodiment, the parameter is formed by the level of an x-ray flux of the x-ray source of the x-ray system. In such a case, there may be provision, for example, that, as from a certain threshold value of the x-ray flux, for all pixel elements, the first circuit is activated individually and below the threshold value of the second circuit (e.g., coincidence circuit). In this way, errors caused by incorrect coincidences are avoided at high x-ray fluxes. With low x-ray fluxes, the coincidences are also taken into account.

In accordance with a further embodiment, the parameters are formed by the positions of the respective pixel elements on the x-ray detector. For example, for edge pixels with few neighboring pixel elements of detector modules, the first circuit or both circuits may be activated. For pixel elements with eight neighboring pixel elements, the second circuit (e.g., coincidence circuit) may be activated.

In accordance with a further embodiment, in the event of both circuits being activated, the image datasets that are obtained by the first circuit may be used for correction of the image datasets of the second circuit.

In accordance with an embodiment, the second circuit is additionally embodied, in the event of a counting in the pixel element jointly with coincidently occurring signals, to suppress the counting in the neighboring pixel elements of which the signals coincide. This function implemented with a known coincidence circuit prevents signals from being counted more than once and thus falsifying the x-ray image. The decision as to the pixel element in which coinciding signals are counted may, for example, depend on which pixel element has the highest signal. Such a coincidence circuit may be implemented by analog or digital circuit technology and is known.

In an advantageous manner, for a practical implementation of the x-ray detector, each circuit has a conversion facility with a charge amplifier, at least one discriminator with one adjustable threshold value in each case and a digital memory unit (e.g., a counter). The signal converted in the x-ray converter into electrical charge and fed into the corresponding circuit is amplified with the aid of the charge amplifier and then counted if the signal lies above the adjustable threshold value, which is established using the discriminator. In this way, only electrical signals that exceed the threshold value are counted, so that interference may be filtered out, or only events with energies above a desired threshold will be counted. Subsequently, the signal is counted accordingly.

In accordance with a further embodiment, the x-ray detector is embodied for an energy resolution. One or both circuits each have at least two energy discriminators with adjustable threshold values. In this way, an energy-selective imaging may be provided, since the level of the electrical signal is determined by the energy of the x-ray quantum through which the electrical signal was generated. Two, three, four or a plurality of first memory units and threshold values may be provided. An energy-selective imaging allows an even higher x-ray image quality and new clinical applications.

In one embodiment, with quadratic pixel elements, up to eight neighboring pixel elements may be present and incorporated into a coincidence circuit.

In accordance with an embodiment, each pixel element has at least one controllable switch for individual or joint activation of the first circuit and the second circuit. The circuits may, for example, be controlled and activated automatically by this. If necessary, a manual activation may also be provided. The automatic control may also be undertaken in conjunction with the parameter or parameters determined. Thus for example, if a high x-ray flux is determined (e.g., by interrogation of the system controller or by measurement), the switch for the first circuit may be activated automatically for all pixel elements, since a coincidence circuit may no longer be sensible. With a medium or low x-ray flux, the switches, which activate the coincidence circuit, are then activated. Control dependent, for example, on the count rate to be expected for the application (dose/unit of time) may also be provided.

BRIEF DESCRIPTION OF THE DRAWINGS

FIG. 20 shows one embodiment of a method for recording an x-ray image.

DETAILED DESCRIPTION

Figure 12:
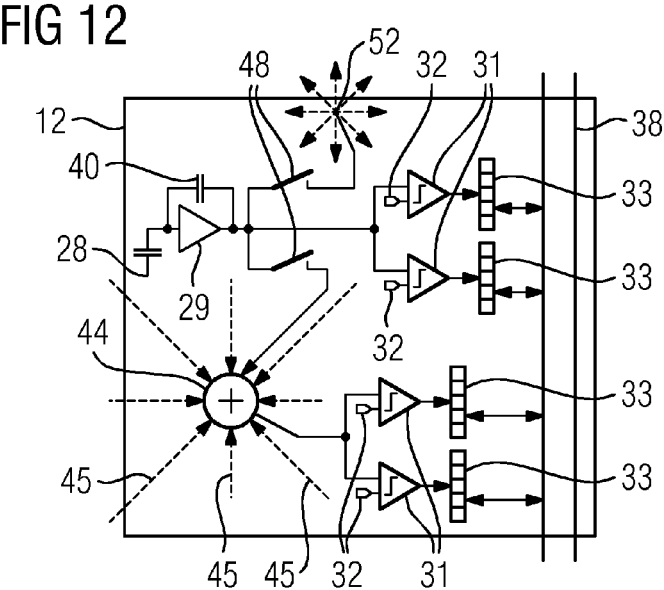
FIG. 12 shows one embodiment of a pixel element with a first circuit and a second circuit in the form of a coincidence circuit.

FIG. 12 shows one embodiment of a pixel element 12 including a first circuit in which a directly entered signal may be converted individually into a count signal and may be counted, and a second circuit in the form of a next-neighbor coincidence circuit that also includes signals of neighboring pixel elements. In a next-neighbor coincidence circuit, the adjoining neighboring pixel elements may be taken into account (e.g., up to eight pixel elements for a quadratic pixel form).

The electrical charge passes a charge input 28 (e.g., after a conversion of an x-ray quantum into an electrical signal has taken place in the direct converter beforehand), is collected in the pixel element and is amplified at the pixel element with the aid of a charge amplifier 29 and a feedback capacitor 40. A first circuit is shown in the extension of the path of the charge amplifier. A second circuit is shown by the branch directed downwards, which is additionally able to be activated by a switch 48. In addition, as part of the second circuit, the branch directed upwards may also be active by a switch 48.

In one or more of the present embodiments, either only the first circuit or both circuits may be activated depending on the setting of the switch or switches 48. The first circuit is energy-discriminating, with two discriminators and associated threshold values differing from one another. An event is counted by the respective counter 34 being incremented by one if the signal lies above the respective adjustable threshold value. This is established via the respective discriminator 31. Subsequently, this may be read out by a control and readout unit 38, and for a plurality of such pixel elements, an x-ray image (e.g., a raw x-ray image) may be generated.

The second circuit (e.g., coincidence circuit) is energy-discriminating in two stages. When the second circuit is activated (e.g., the lower switch 48 is closed), the signal of the pixel element is summed in a summation unit 44 with coincidence signals 45 from neighboring pixel elements. For quadratic pixel elements, the coincidence signals of up to eight neighboring pixel elements may be included depending on the embodiment of the circuits and position of the pixel element. Thus, because of the detector boundary, only three or five neighboring pixel elements may be present at the edge or the corner of an x-ray detector or detector module of the x-ray detector, or the remainder is not able to be connected for circuit technology reasons (e.g., ASIC boundary), so that a coincidence circuit is also possible with between one and seven neighboring pixel elements.

The summed signal is then counted by the respective counter 33 being incremented by one if the summed signal lies above the threshold value or the respective threshold values. The threshold value is established by the respective discriminator 31. Subsequently, this may be read out by the control and readout unit 38, and a further x-ray may be generated from a plurality of such pixel elements. In addition, an upper switch 48 may also be activated. This leads to an analog signal output 52 and supplies the signal if necessary to the coincidence circuits of the neighboring pixel elements. In specific cases, for example, the own signal is smaller than a coincidence signal of a neighboring pixel element. Also, almost always on activation of the second circuit, the signal in the coincidence case may be supplied to the neighboring pixel elements, which may generate a summed signal.

One embodiment of an x-ray detector has a matrix including a plurality of such pixel elements that are both in a position to be able to merely discriminate and count their own signal and also to discriminate and to count a summed signal including their own signal and the signals of the direct neighbors, or to supply the pixel elements in each case to a number of discriminators in order to make energy discrimination possible. Such an x-ray detector may have a plurality of detector modules. The plurality of detector modules are constructed from a plurality of pixel elements. The detector modules may, for example, each have 100 pixel elements. The x-ray detector also has an x-ray converter above the matrix of pixel elements (e.g., a direct converter made of CdTe or CZT) that is configured for converting x-ray quanta into electrical signals.

The circuit only counting the own signal of the pixel element (e.g., first circuit) and the coincidence circuit (e.g., second circuit) of the respective pixel elements may be realized as both an analog and a digital circuit. The coincidence circuit may be configured such that the coincidence circuit sums the signal from the own pixel element and the possibly occurring signals of the neighboring pixel elements, registers the signals in one or more counters and at the same time suppresses the counting of an event in the neighboring pixel elements. In the event of a coincidence, the option may be provided, for example, for information to be able to be written both from the counter to the control and readout unit and also from the readout logic to the counter. This may be provided, for example, for the case in which multiple counting is to be canceled again.

Figure 14:
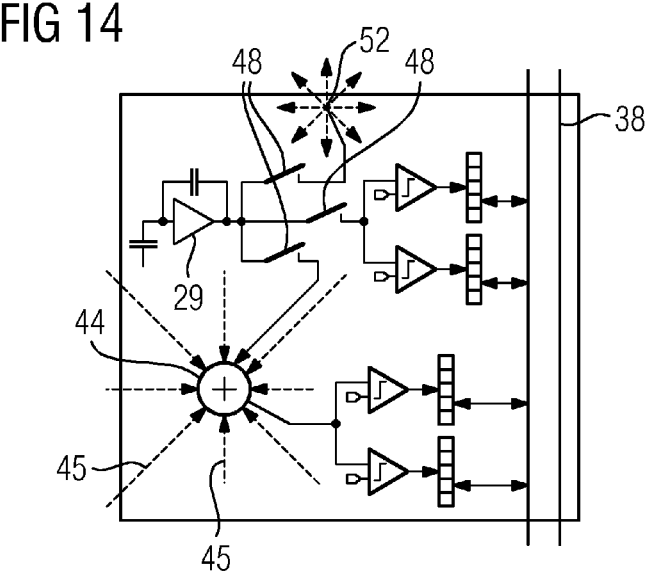
FIG. 14 shows one embodiment of a pixel element as in FIG. 12 with an additional switch.

One embodiment of a pixel element is shown in FIG. 14, which in addition to the activation of the first circuit, has a further switch 48. In such a pixel element, the first circuit may be activated individually, and the second circuit may be activated individually. Both circuits may also be activated simultaneously.

Figure 13:
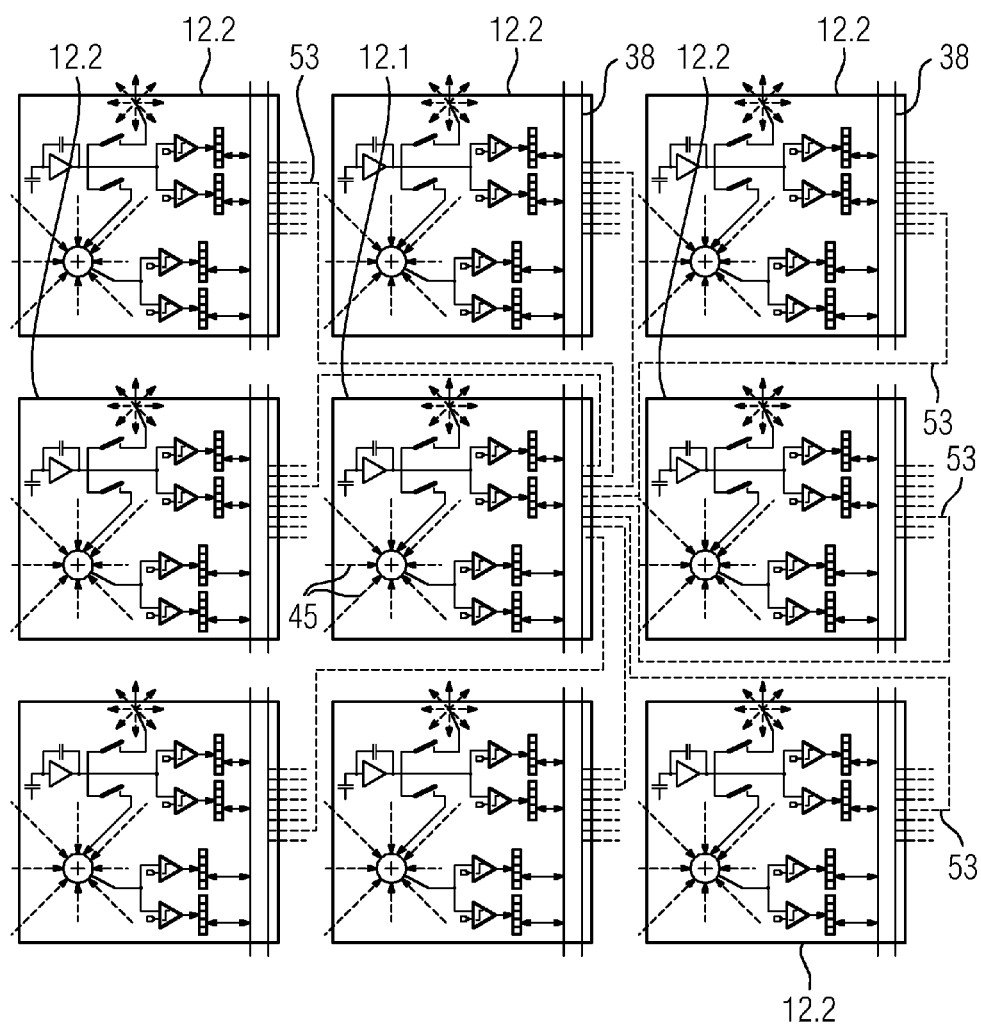
FIG. 13 shows a cross-section from a matrix of one embodiment of pixel elements with one central and eight neighboring pixel elements.

FIG. 13 shows a cross-section from a matrix with nine pixel elements in accordance with FIG. 12. The central pixel element 12.1 is surrounded by eight neighboring pixel elements 12.2 that are all connected with the central pixel element 12.1 by a coincidence circuit. Digital signal paths 53 via the control and readout unit and the analog signal paths 45 that convey analog coincidence signals are also present. Thus, the summation of the energy of an event that deposits parts of the total energy in a number of pixel elements may be provided, and the total energy is only discriminated in one pixel element and counted in the corresponding counter.

Figure 15:
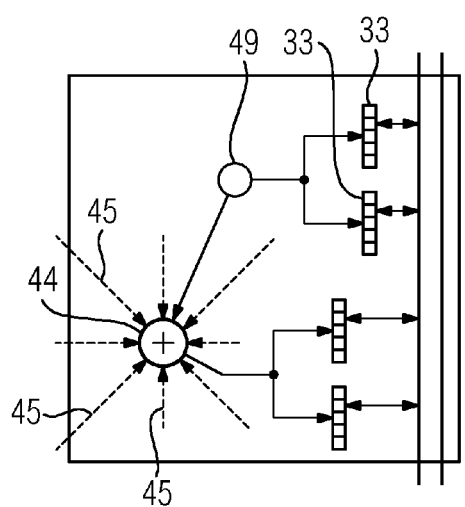
FIG. 15 shows one embodiment of an abstracted pixel element with a two-stage discrimination for both circuits.
Figure 16:
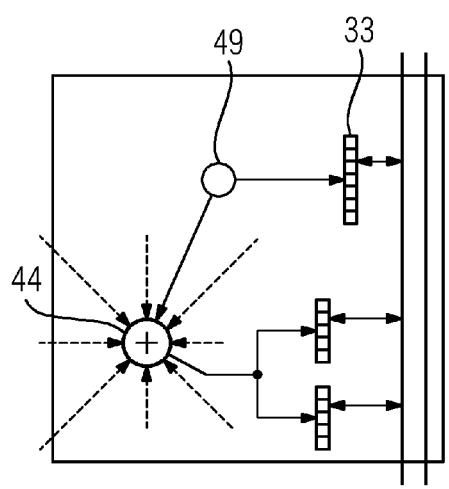
FIG. 16 shows one embodiment of an abstracted pixel element with a two-stage discrimination for the second circuit and a single discrimination for the first circuit.

Further pixel elements are shown in FIGS. 15 and 16, in which, for the sake of clarity, the elements upstream from the circuits, such as a charge amplifier, for example, are omitted and only indicated as pixel signal 49. In FIG. 15, the first circuit and the second circuit each have two discriminators with threshold values, so that a two-stage energy discrimination may take place. A pixel element, in which the first circuit only has one discriminator and one threshold value, is shown in FIG. 16. Depending on requirement and application, any given number of discriminators and threshold values may be provided.

Figure 17:
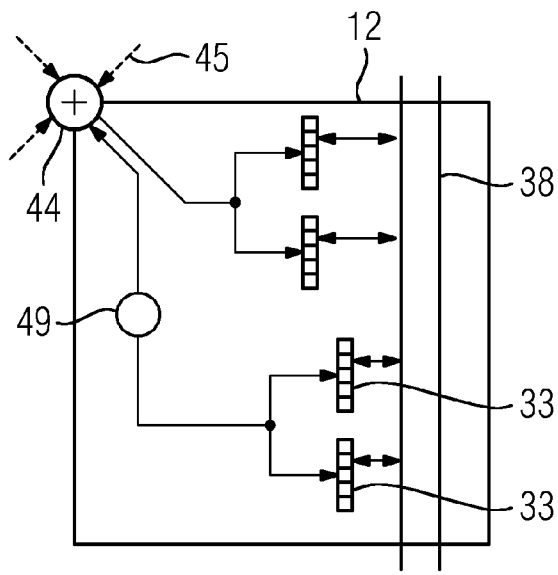
FIG. 17 shows one embodiment of an abstracted pixel element with a two-stage discrimination for both circuits, in which three neighboring pixel elements contribute to the coincidence circuit.
Figure 18:
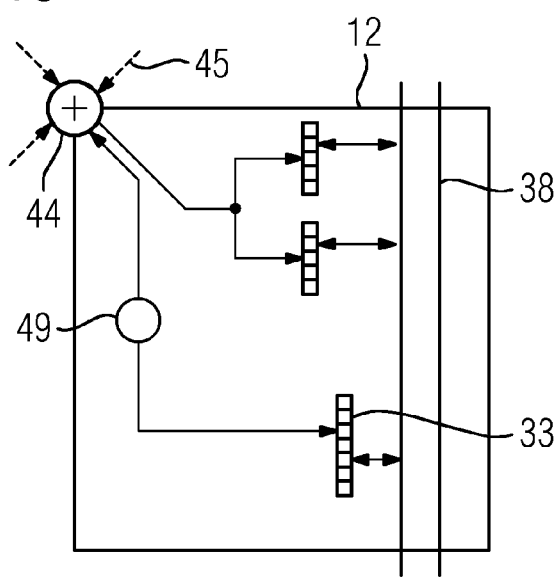
FIG. 18 shows one embodiment of an abstracted pixel element with a two-stage discrimination for the second circuit and a single discrimination for the first circuit, in which three neighboring pixel elements contribute to the coincidence circuit.
Figure 19:
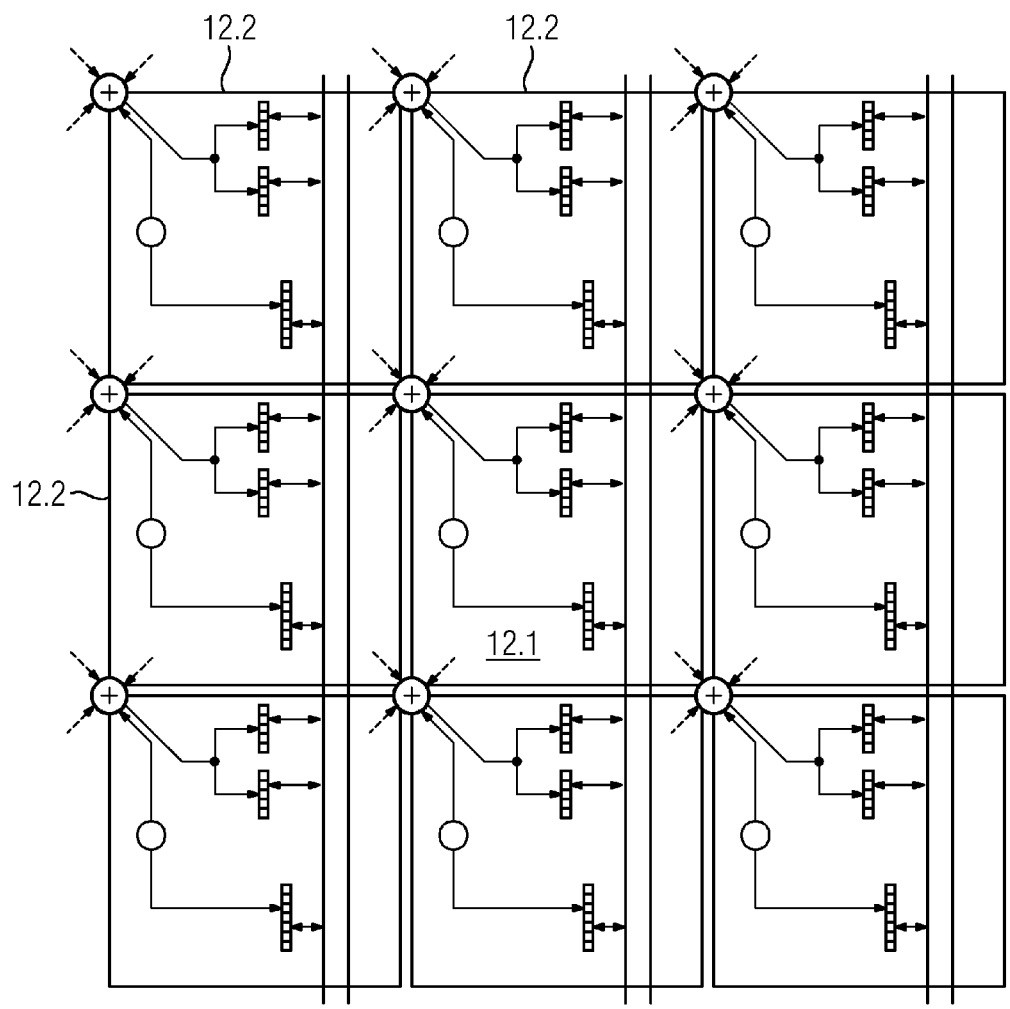
FIG. 19 shows a cross-section from a matrix of pixel elements in accordance with FIG. 18.

Pixel elements are shown in FIGS. 17 to 19, for which only three neighboring pixel elements in each case in relation to the left upper corner of the pixel element, for example, are included in the coincidence circuit. FIG. 17 shows a pixel element that both for the first circuit (e.g., counting only of own signals) and also for the second circuit (e.g., coincidence circuit) has energy discrimination in two stages. FIG. 18 shows a pixel element having a simple discrimination with only one threshold value for the first circuit (e.g., counting of only own signals) and having an energy discrimination in two stages for the second circuit (e.g., coincidence circuit).

FIG. 19 shows a cross-section from a matrix with nine pixel elements in accordance with FIG. 18. The circuits may be implemented both as analog and digital circuits. On activation of the respective second circuit (e.g., coincidence circuit), the signals of four directly neighboring pixel elements are combined in each case. Thus, as viewed by the central pixel element 12.1, as well as the own signal, the signals of the neighboring pixel element 12.2 above, to the left and to the left above are summed and counted, or in the case of a number of counters, are energy-discriminated and assigned to the corresponding counters. On activation of the first circuit, the own signal of the pixel element is counted, or in the case of a number of discriminators, energy-discriminated and assigned to the corresponding counters.

For optimization of the space requirement on the pixel element and for optimization of the data transfer, there may be provision in the pixel element for the counter bit depths for the counters that process the sum and coincidence signals to differ from the counter bit depths of the counters that only process the signal of the own pixel element (e.g., without information of the neighboring pixel elements). For example, the counters without coincidence, depending on choice of the discriminator threshold, may be configured such that the counters create higher count rates, since part events may be counted if the energy is divided between at least two neighboring pixel elements.

The counter bit depths that are provided for the different discriminator threshold values may be selected to be of different depths, since it is likely in advance that there will only be a certain proportion of the x-ray quanta of the spectrum. Events may be counted in a counter as soon as the corresponding discriminator threshold value is exceeded. In other words, the counter with the lowest threshold value may count more events than a counter with a high threshold value. The bit depth may be adapted accordingly.

Figure 1:
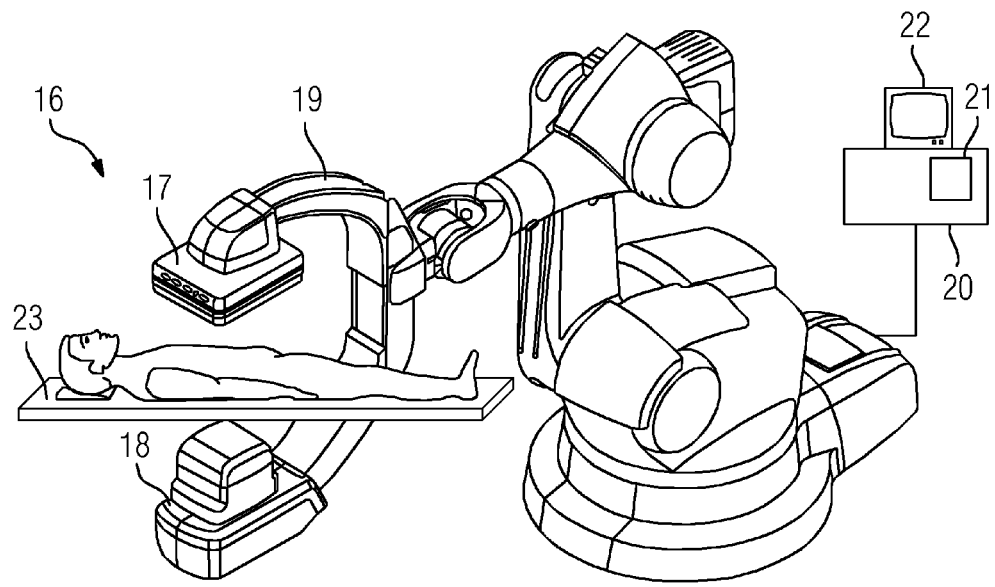
FIG. 1 shows a known x-ray system for use in interventional procedures.
Figure 2:
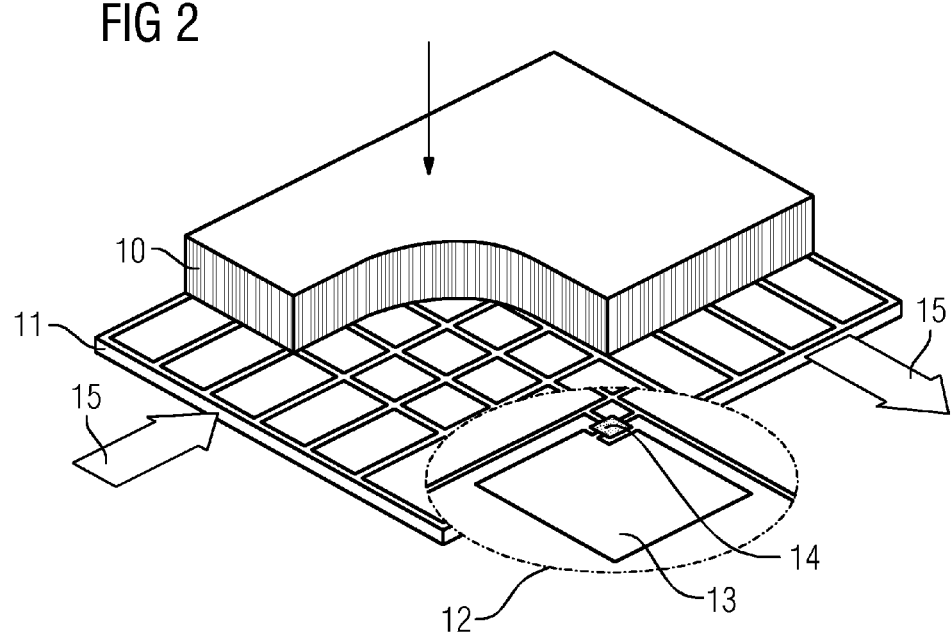
FIG. 2 shows a known x-ray detector with a scintillator.
Figure 3:
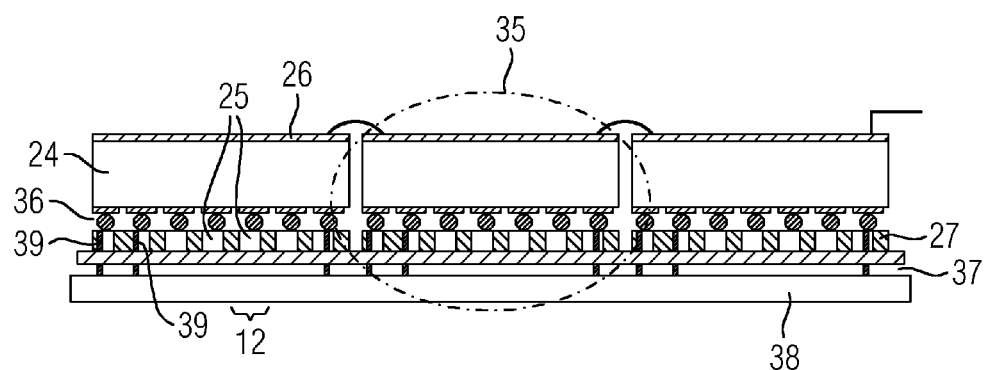
FIG. 3 shows a cross-section through a known x-ray detector with a number of detector modules.
Figure 4:
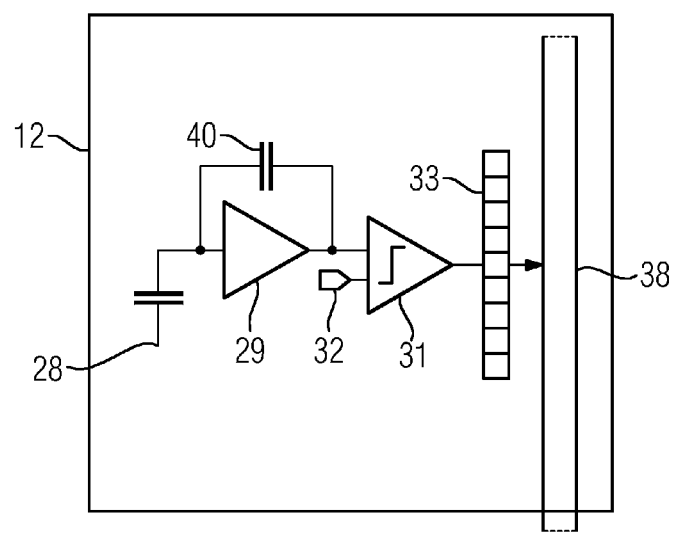
FIG. 4 shows a diagram of central function elements of a counting pixel element of a known x-ray detector.
Figure 5:
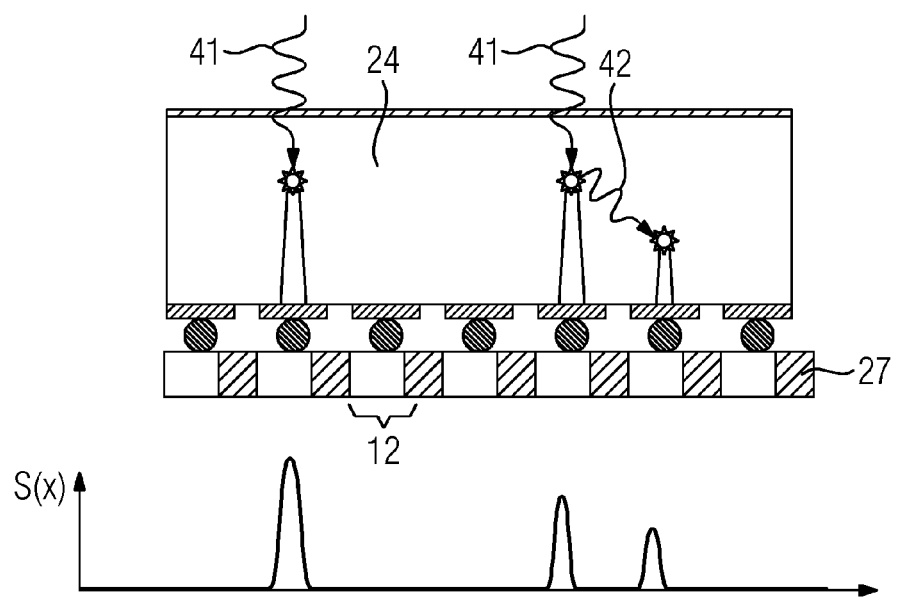
FIG. 5 shows a cross-section through a detector module and the absorption processes running therein.
Figure 6:
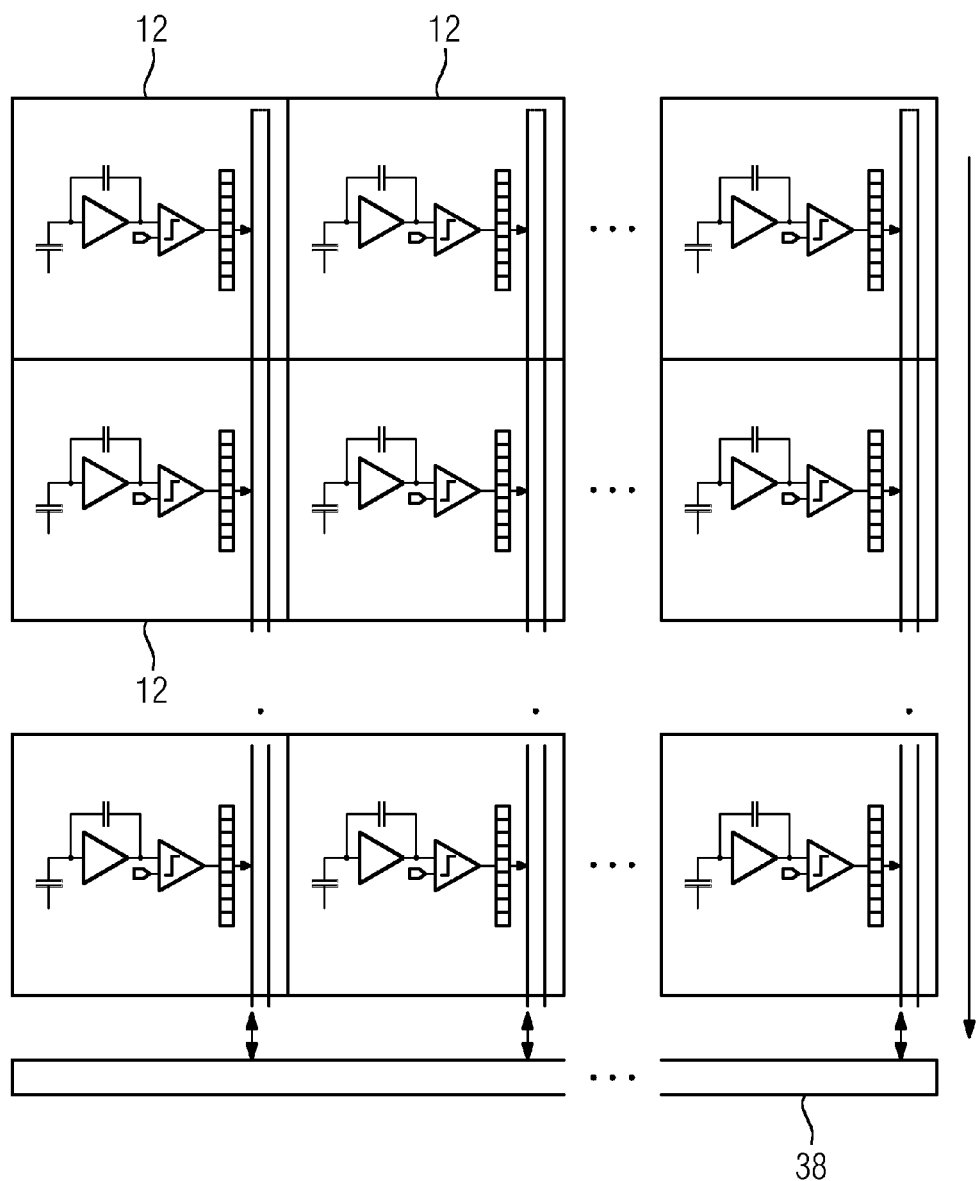
FIG. 6 shows a matrix of counting pixel elements of a known x-ray detector with control and readout logic.
Figure 7:
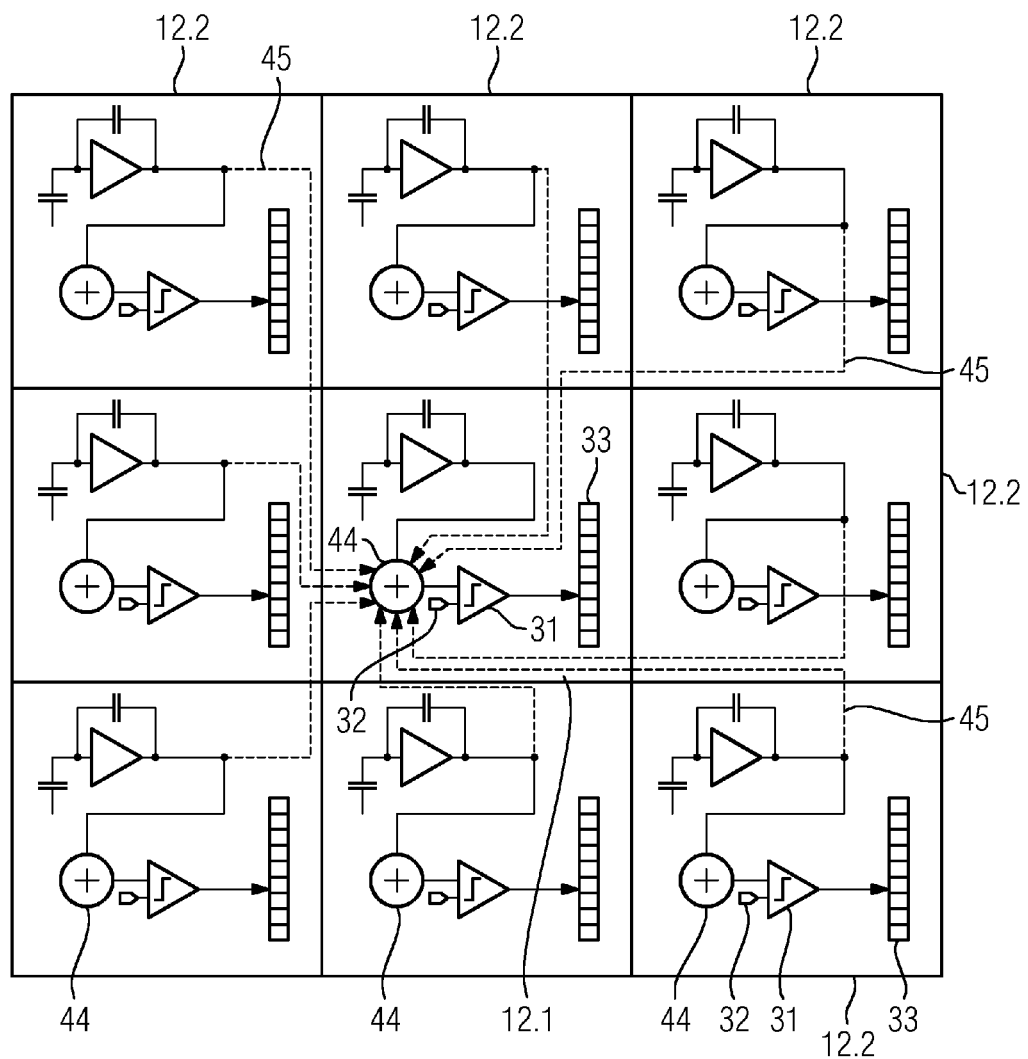
FIG. 7 shows a cross-section of a matrix of counting pixel elements with a known analog coincidence circuit.
Figure 8:
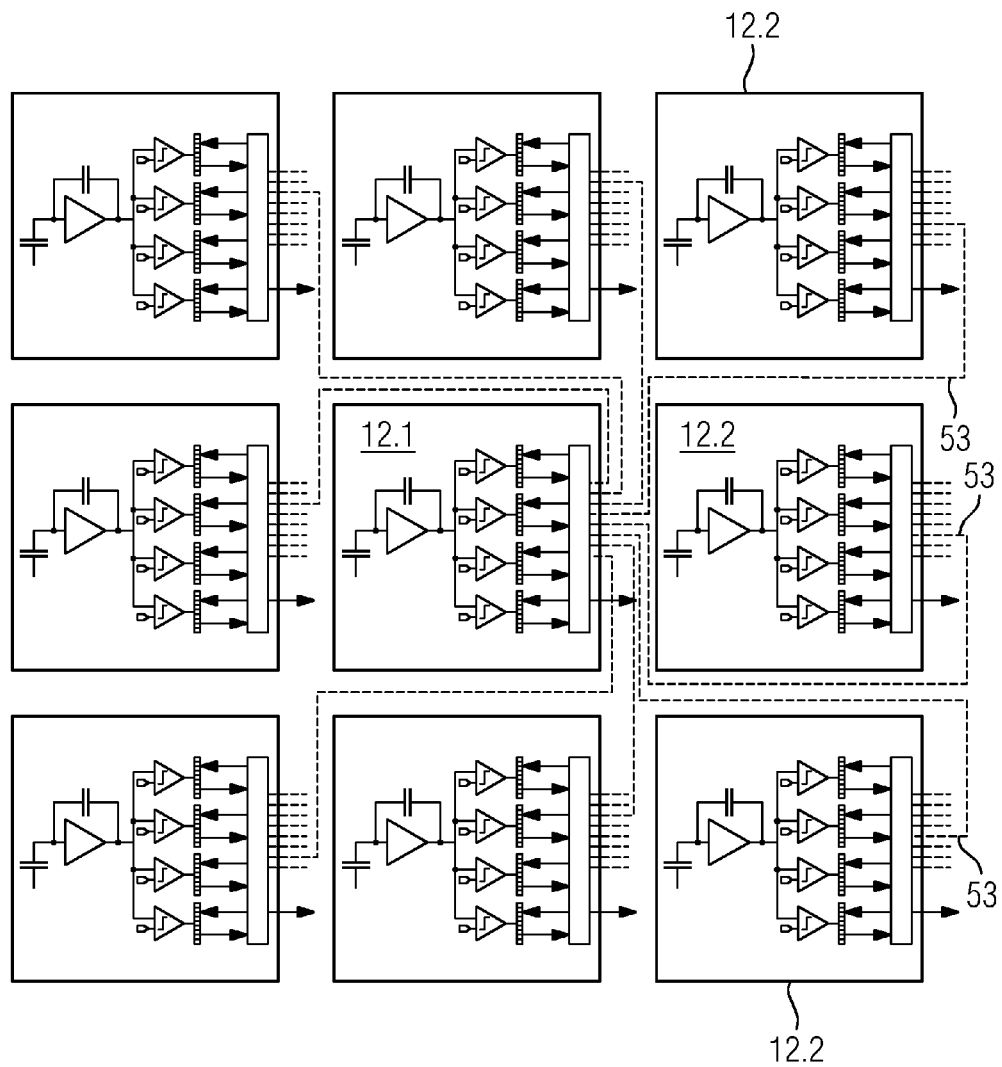
FIG. 8 shows a cross-section of a matrix of counting pixel elements with a known digital coincidence circuit.
Figure 9:
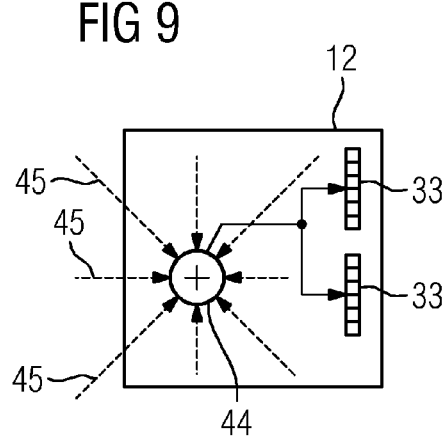
FIG. 9 shows a known pixel element presented in simplified form that has a coincidence circuit with eight neighboring pixel elements.
Figure 10:
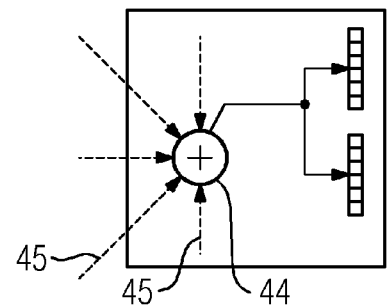
FIG. 10 shows a known pixel element presented in simplified form that has a coincidence circuit with five neighboring pixel elements.
Figure 11:
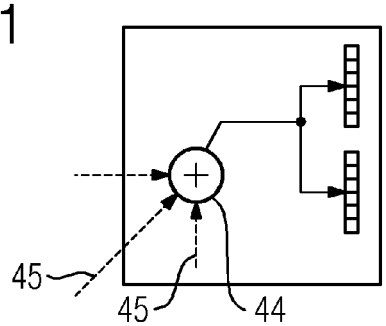
FIG. 11 shows a known pixel element presented in simplified form that has a coincidence circuit with three neighboring pixel elements.

FIG. 20 shows one embodiment of a method for recording and processing x-ray images with one embodiment of an x-ray detector having a plurality of pixel elements each with a first circuit and a second circuit. The pixel elements are arranged, for example, in detector modules (as shown in FIG. 3). For example, the first circuit (e.g., simple circuit) is simply-discriminating, and the second circuit (e.g., coincidence circuit) is energy-discriminating in two stages. The method functions correspondingly for other embodiments without energy discrimination or with multistage energy discrimination. Both circuits are activated.

X-ray images $Z_A$ of the second circuit and the first counter (e.g., first threshold value), x-ray images $Z_B$ of the second circuit and the second counter (e.g., second threshold value) and raw x-ray images C of the first circuit are recorded in each case. Subsequently, using a correction method 50, the x-ray images $Z_A$ of the second circuit and of the first counter are corrected by the raw x-ray images C of the first circuit, and the x-ray images $Z_B$ of the second circuit and of the second counter are also corrected by the raw x-ray images C of the first circuit. The result is corrected x-ray images $Z'_A$ of the second circuit and the first counter and corrected x-ray images $Z'_B$ of the second circuit and the second counter. X-ray images R are then created from these by further image processing methods 51.

The correction of the x-ray images of the coincidence circuit by the raw x-ray images of the simple circuit may be used, for example, for linearization and for correction of the pileup effects at higher count rates, since the counters of a coincidence circuit (e.g., next neighbor coincidence circuit) paralyze more quickly (e.g., no longer distinguish between different events and therefore count fewer events than are actually present) than the counters that may count the events of the own pixel.

In addition or as an alternative, corrections to the raw x-ray images from pixel elements lying at the edges or corners of detector modules or the x-ray detector that have fewer than, for example, eight or three direct neighbors, may be carried out. For these pixel elements, the summation of the energy is in many cases incomplete. Since these pixel elements may be important (e.g., for interpolations between neighboring detector modules), a restoration of the coincidence count rates that have actually occurred or at least a homogenization with pixel elements lying centrally is advantageous.

The structure that is shown in FIGS. 17 and 18 may also be used via the summation in these cases to bin four neighboring pixel elements (e.g., combine them). For a pixel size of, for example, 150 μm×150 μm, the binned pixel elements would amount to 300 μm×300 μm. The structures that are shown in FIGS. 12 to 16 may have a similar effect in a 3×3 neighborhood.

Count rate errors that occur as a function of the x-ray flux (e.g., pile-up effects, paralysis) may be corrected by the method of one or more of the present embodiments. In addition, when both circuits are used simultaneously for pixel elements lying at the edge or the corner of detector modules (e.g., on account of the small module surfaces, are used and are not inconsiderable), for which a summation by the coincidence circuit only exists to some extent, correction and calibration may be performed through the simultaneous counting without coincidence (e.g., simple circuit). Also, while simultaneously retaining a correction function of the count rates, a binning function may be supported by the pixel-by-pixel counting (e.g., non-coincidence counter).

As well as simple discriminators, window discriminators may also be used in an x-ray detector of one or more of the present embodiments. A window discriminator includes both an upper threshold value and a lower threshold value.

One or more of the present embodiments relate to a counting digital x-ray detector for recording x-ray images of an object irradiated by x-ray radiation having a direct x-ray converter for converting x-ray radiation into an electrical signal and a matrix with a plurality of counting pixel elements. At least a part of the counting pixel elements each have a signal input and two circuits for converting the signal into a count signal. A first circuit of the two circuits is configured for converting the signal entered directly in the respective pixel element individually into a count signal and counting the signal. A second circuit of the two circuits is configured for converting the signal entered directly in the respective pixel element together with coincidently occurring signals of at least one neighboring pixel element into a count signal and counting the signal. The first circuit and/or the second circuit are able to be activated individually and both together.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A counting digital x-ray detector for recording x-ray images of an object irradiated by x-ray radiation, the counting digital x-ray detector comprising:
   an x-ray converter for converting x-ray radiation into an electric signal; and
   a matrix with a plurality of counting pixel elements,
   wherein each counting pixel element of at least a portion of counting pixel elements of the plurality of counting pixel elements has a signal input and two circuits for converting the electrical signal into a count signal,
   wherein a first circuit of the two circuits is configured to convert a signal entering a respective pixel element of the plurality of counting pixel elements directly into a count signal and to count the count signal, and the second circuit is configured to convert the signal entering the respective pixel element directly together with coincidently occurring signals of at least one neighboring pixel element of the plurality of counting pixel elements into a count signal and to count the count signal, and
   wherein the first circuit, the second circuit, or the first circuit and the second circuit are activatable individually, and the first circuit and the second circuit are activatable together.

2. The counting digital x-ray detector of claim 1, wherein each counting pixel element of the plurality of counting pixel elements has a first circuit and a second circuit.

3. The counting digital x-ray detector of claim 1, wherein the second circuit is configured, in the event of a counting in the pixel element together with the coincidently occurring signals, to suppress the counting in neighboring pixel elements of the plurality of counting pixel elements, of which the signals coincide.

4. The counting digital x-ray detector of claim 1, wherein the second circuit is formed by a coincidence circuit.

5. The counting digital x-ray detector of claim 1, wherein each circuit of the two circuits has a converter device with a charge amplifier, at least one discriminator with an adjustable threshold value, and a digital memory unit.

6. The counting digital x-ray detector of claim 5, wherein the digital memory unit comprises a counter.

7. The counting digital x-ray detector of claim 1, wherein the counting digital x-ray detector is configured for an energy resolution, and wherein one or both of the two circuits have at least two energy discriminators with adjustable threshold values.

8. The counting digital x-ray detector of claim 1, wherein the second circuit is configured to convert the signal entering the respective pixel element directly together with coincidently occurring signals from between one and eight neighboring pixel elements of the plurality of counting pixel elements into a count signal and to count the count signal.

9. The counting digital x-ray detector of claim 1, further comprising at least one controllable switch operable for individual or joint activation of the first circuit and the second circuit.

10. The counting digital x-ray detector of claim 1, wherein the counting digital x-ray detector is configured for automatic activation of the first circuit, the second circuit, or the first circuit and the second circuit.

11. The counting digital x-ray detector of claim 1, wherein the x-ray converter is a direct x-ray converter.

12. A method for recording an x-ray image of an object with a counting digital x-ray detector, wherein the counting digital x-ray detector is assigned to an x-ray system with an x-ray source for emitting x-ray radiation, the method comprising:
determining or interrogating at least one parameter of the x-ray system, the counting digital x-ray detector or a respective pixel element of a plurality of pixel elements;
activating, individually for each pixel element of at least a portion of pixel elements of the plurality of pixel elements with two circuits, both of the two circuits simultaneously depending on a result of the determination of the at least one parameter;
converting, pixel-by-pixel, the x-ray radiation passing through the object and striking the counting digital x-ray detector into electrical signals in the plurality of pixel elements;
converting the electrical signals into count signals by the respective activated circuit or circuits of the plurality of pixel elements and storing the count signals; and
reading out the count signals and creating one or more image datasets representing the object.

13. The method of claim 12, wherein the at least one determined parameter is formed by a level of an x-ray flux of the x-ray source of the x-ray system.

14. The method of claim 12, wherein the at least one parameter is formed by positions of the respective pixel elements on the counting digital x-ray detector.

15. The method of claim 12, wherein, in the event of both of the two circuits being activated, the one or more image datasets obtained by a first circuit of the two circuits are usable for correction of the one or more image datasets of a second circuit of the two circuits.

16. The method of claim 12, wherein, when a circuit of the two circuits is activated, in the event of counting in the respective pixel element together with coincidently occurring signals, the counting in of neighboring pixels of the plurality of pixels, of which the signals coincide, is suppressed.

17. The method of claim 16, wherein, when the circuit is activated, in the event of counting in the respective pixel element together with the coincidently occurring signals, the counting in of the neighboring pixels of which the signals coincide is suppressed in the event of the signal of the pixel element being higher than the signals of the neighboring coinciding pixel elements.

18. The method of claim 13, wherein, when a circuit of the two circuits is activated, in the event of counting in the respective pixel element together with coincidently occurring signals, the counting in neighboring pixels of the plurality of pixels, of which the signals coincide, is suppressed.

19. The method of claim 14, wherein, when a circuit of the two circuits is activated, in the event of counting in the respective pixel element together with coincidently occurring signals, the counting in neighboring pixels of the plurality of pixels, of which the signals coincide, is suppressed.

20. A counting digital x-ray detector for recording x-ray images of an object irradiated by x-ray radiation, the counting digital x-ray detector comprising:
an x-ray converter for converting x-ray radiation into an electric signal and a matrix with a plurality of counting pixel elements,
wherein each counting pixel element of at least a portion of the counting pixel elements has a signal input and two circuits for converting the signal into a count signal in each case,
wherein the first circuit is configured to convert the signal entering the respective pixel element directly into a count signal and to count the signal, and the second circuit is configured to convert the signal entering the respective pixel elements directly together with coincidently occurring signals of at least one neighboring pixel element into a count signal and to count the signal, and
wherein the first circuit, the second circuit, or the first circuit and the second circuit are able to be activated individually, and the two circuits are able to be activated together.

* * * * *